F. O. ULRICH.
AUTOMOBILE LOCK.
APPLICATION FILED JAN. 6, 1914.
1,097,486.
Patented May 19, 1914.
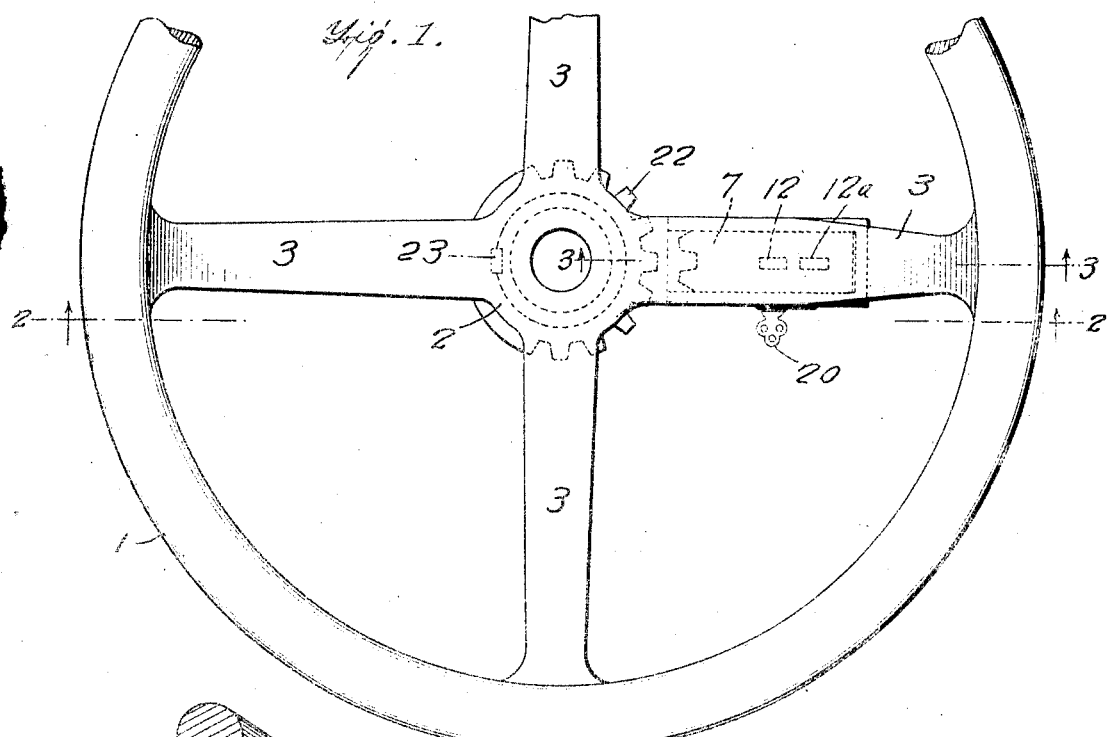
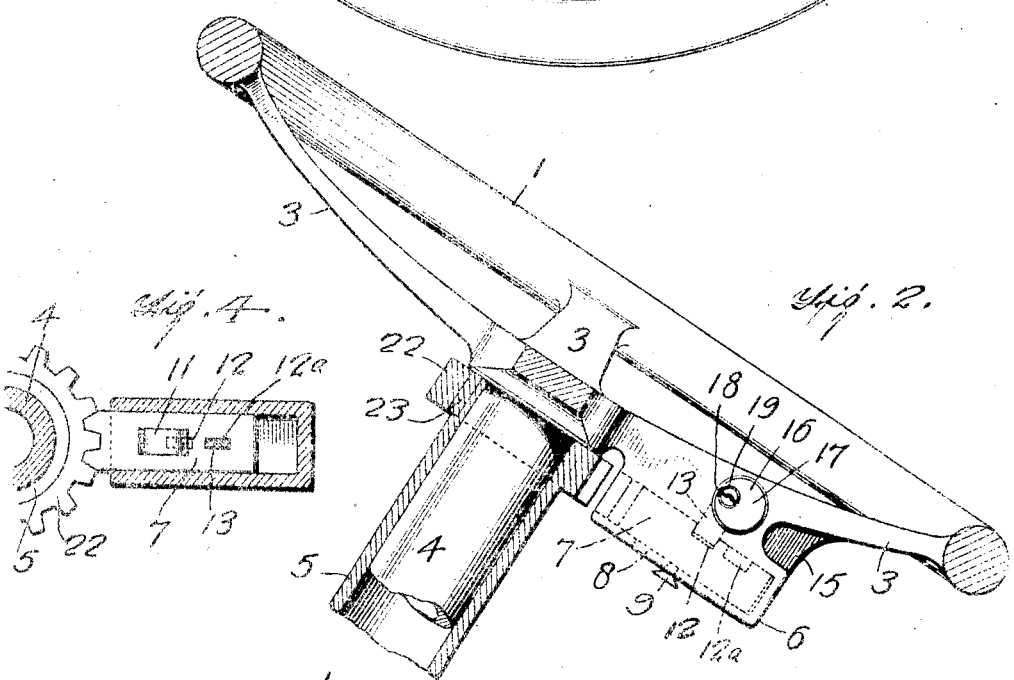
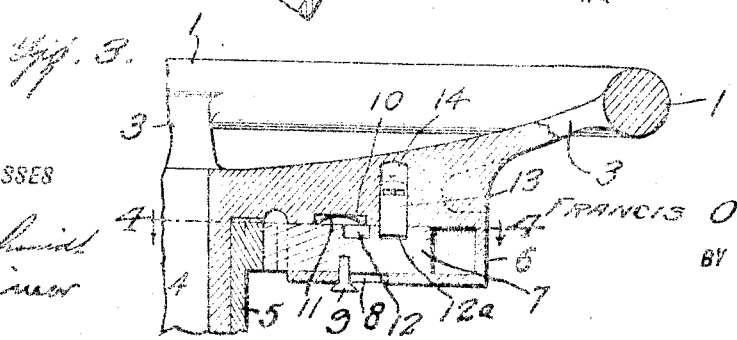
INVENTOR
FRANCIS O. ULRICH.
WITNESSES
ATTORNEYS

UNITED STATES PATENT OFFICE.

FRANCIS O. ULRICH, OF TAMAQUA, PENNSYLVANIA.

AUTOMOBILE-LOCK.

1,097,486.  Specification of Letters Patent.  Patented May 19, 1914.

Application filed January 6, 1914. Serial No. 810,574.

*To all whom it may concern:*

Be it known that I, FRANCIS O. ULRICH, a citizen of the United States, and a resident of Tamaqua, in the county of Schuylkill and State of Pennsylvania, have invented a new and useful Improvement in Automobile-Locks, of which the following is a specification.

My invention is an improvement in automobile locks, and has for its object to provide a device of the character specified, adapted for use in connection with the steering wheel of an automobile for permitting the said wheel to be locked to the bearing post sleeve, to prevent unauthorized interference with the said wheel during the absence of the owner, and wherein a bolt is provided mounted on the wheel and movable toward and from the bearing post sleeve, together with means for holding the bolt in operative or inoperative position.

In the drawings:—Figure 1 is a partial plan view of a steering wheel provided with the improved lock, Figs. 2 and 3 are sections on the line 2—2 and 3—3, respectively, of Fig. 1, and Fig. 4 is a section on the line 4—4 of Fig. 3, Figs. 2, 3 and 4 looking in the direction of the arrows adjacent to the respective lines.

The present embodiment of the invention is shown in connection with a steering wheel of usual form, and having a rim 1, a hub 2, and spokes 3, connecting the hub to the rim. The wheel is secured to the upper end of the steering post 4 in any suitable or desired manner and the post is mounted in the bearing sleeve 5.

A casing 6 is mounted on one of the spokes of the steering wheel, the said casing in the present instance, being integral with the spoke, and depending below the same, and within the casing is mounted a bolt 7, the said bolt being movable toward and from the bearing sleeve 5. The casing is longitudinally slotted on its under side as indicated at 8, and a button connected with the bolt extends through the slot to permit the bolt to be moved toward and from the bearing sleeve. In the present instance the button is a set screw 9, which is threaded into the under side of the bolt, and the head of the screw extends through the slot 8 to permit its engagement by the finger of the operator or driver.

At the upper side of the interior of the casing, a recess 10 is provided, the said recess being adapted to receive an arched spring 11, whose ends bear upon the upper face of the bolt, and whose body engages the bottom of the recess. The spring is adapted to hold the bolt against accidental movement, and exerts only pressure enough to hold the bolt from movement by gravity, or from jolt or jar. The bolt is also provided in its upper face with two recesses 12 and 12$^a$, respectively, and the said recesses are adapted for engagement by a locking bolt 13, which is mounted in a recess 14 extending upwardly from the casing 6. The recess 14 opens at the side of the integral connection 15 between the casing 6 and the spoke 3, by means of an opening 16, and the lock proper is arranged in the said opening 16.

The lock 17 is of any desired form, being cylindrical in the present instance, and the key hole 18 is mounted in a cylindrical tumbler 19, which is arranged to rotate in the lock 17. The key 20 is introduced in the key hole and turned, to lift the locking bolt 13 out of engagement with the recesses 12 and 12$^a$.

The spring 11 is of sufficient width to extend across the adjacent recess 12 and the inner end of the locking bolt 7 is provided with teeth as shown at 21. A ring 22 is keyed on to the upper end of the bearing sleeve 5, by means of a key 23, and the said ring is provided with teeth for coöperation with the teeth 21 of the locking bolt. The ring 22 is provided with a series of radial teeth which cover more than one-half the circumference of the ring, so that the bolt may engage the teeth whatever the position of the steering wheel.

In use, when the machine is running, the bolt 7 is in the position of Figs. 1 and 2, that is, in retracted position and the locking bolt 13 holds the bolt 17 in the said position. When the machine is stopped, and the driver desires to leave the same, the front wheels are turned at an angle either toward the curb or toward the road, and the bar or bolt 7 is moved into the position of Figs. 3 and 4, that is, to cause the teeth 21 to engage the teeth of the ring 22. The key is now turned to move the locking bolt 13 into engagement with the recess 12$^a$, and the key is removed from the lock. The machine in this condition cannot be tampered with, since it will be impossible to guide the same. To release the lock it is only necessary to lift the locking bolt 13 out of engagement with the recess 12ª. The bar or bolt 17 is now moved into the position of Figs. 1 and 2 by means of the button 9, and the locking bolt 13 is operated to engage the recess 12. The bolt or bar 7 is now locked out of engagement with the teeth of the ring 22.

I claim:—

1. In an automobile, the combination with the steering wheel and the steering post bearing sleeve, of a ring keyed to the said sleeve near the wheel and provided with a series of radial teeth, the wheel having an integral casing below the wheel and extending radially to the ring, and open at the end adjacent to the ring, a bolt in the casing and having teeth for engaging the teeth of the ring and movable in the casing into and out of engagement with the said teeth, said bolt having longitudinally spaced recesses in its upper face and the casing having a recess with which the recesses of the bolt are adapted to register when the bolt is in engagement with the ring and out of engagement therewith, a locking bolt movable in the recess of the casing for engaging the recesses of the bolt, and a lock in connection with the recess of the casing and having a key hole for engagement by a key to raise and lower the locking bolt, and a spring engaging the bolt for preventing accidental movement thereof, the bolt having means extending beyond the casing for manually moving the same.

2. In an automobile, the combination with the steering wheel and the steering post bearing sleeve, of a ring keyed to the said sleeve near the wheel and provided with a series of radial teeth, the wheel having an integral casing below the wheel and extending radially to the ring, and open at the end adjacent to the ring, a bolt in the casing and having teeth for engaging the teeth of the ring and movable in the casing into and out of engagement with the said teeth, said bolt having longitudinally spaced recesses in its upper face and the casing having a recess with which the recesses of the bolt are adapted to register when the bolt is in engagement with the ring and out of engagement therewith, a locking bolt movable in the recess of the casing for engaging the recesses of the bolt, and a lock in connection with the recess of the casing, and having a key hole for engagement by a key to raise and lower the locking bolt, and a spring engaging the bolt for preventing accidental movement thereof.

3. In an automobile, the combination with the steering wheel and the steering post bearing sleeve, of a ring keyed to the said sleeve near the wheel and provided with a series of radial teeth, the wheel having an integral casing below the wheel and extending radially to the ring, and open at the end adjacent to the ring, a bolt in the casing and having teeth for engaging the teeth of the ring and movable in the casing into and out of engagement with the said teeth, said bolt having longitudinally spaced recesses in its upper face and the casing having a recess with which the recesses of the bolt are adapted to register when the bolt is in engagement with the ring and out of engagement therewith, a locking bolt movable in the recess of the casing for engaging the recesses of the bolt, and a lock in connection with the recess of the casing, and having a key hole for engagement by a key to raise and lower the locking bolt.

4. In an automobile, the combination with the steering wheel and the steering post bearing sleeve, of a ring provided with a series of radial teeth keyed to the post adjacent to the wheel, the wheel having a casing extending radially with respect to the ring, a bolt in the casing having teeth for engaging the teeth of the ring, and movable toward and from the ring, the bolt having manually operated means extending beyond the casing for moving the same into and out of operative position, a lock in connection with the steering wheel and having a key hole for engagement by a key to operate the lock, a locking bolt in connection with the lock and moved thereby, the bolt having recesses for engagement by the locking bolt to hold the bolt in operative and inoperative position.

5. In an automobile, the combination with the steering wheel and the steering post bearing sleeve, of a ring provided with a series of radial teeth keyed to the post adjacent to the wheel, the wheel having a casing extending radially with respect to the ring, a bolt in the casing having teeth for engaging the teeth of the ring, and movable toward and from the ring, a lock in connection with the steering wheel and having a key hole for engagement by a key to operate the lock, and a locking bolt in connection with the lock and moved thereby, the bolt having recesses for engagement by the locking bolt to hold the bolt in operative and inoperative position.

6. In an automobile, the combination with the steering wheel and the steering post bearing sleeve, of a ring provided with a series of radial teeth keyed to the post adjacent to the wheel, the wheel having a casing extending radially with respect to the ring, a bolt in the casing having teeth for engaging the teeth of the ring, and movable toward and from the ring, a lock in connection with the steering wheel and having means for engaging the bolt to hold the same in operative and inoperative position.

7. In an automobile, the combination with the steering wheel and the steering post bearing sleeve, of a ring for connection with the post adjacent to the wheel and provided with radial teeth, a bolt supported on the wheel for movement toward and from the ring and adapted to engage between the teeth of the ring to lock the wheel with respect to the post in any desired position, and a lock in connection with the bolt for the purpose specified.

FRANCIS O. ULRICH.

Witnesses:
  J. O. ULRICH,
  C. E. SITLER.